Nov. 22, 1949     A. W. KOGSTROM     2,488,979
STEERING MECHANISM
Filed April 8, 1948
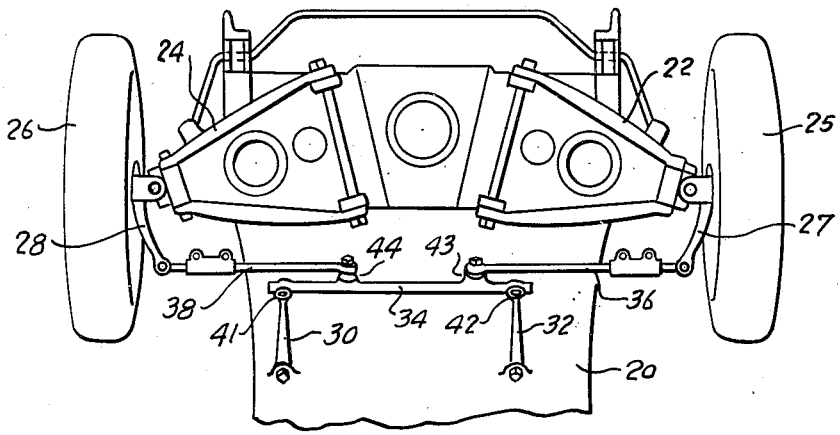
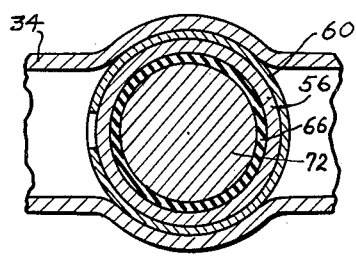
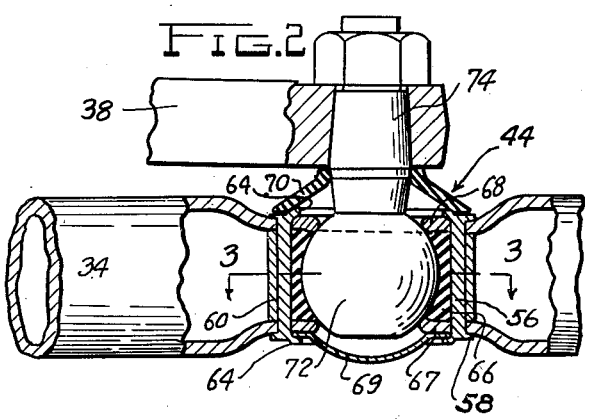
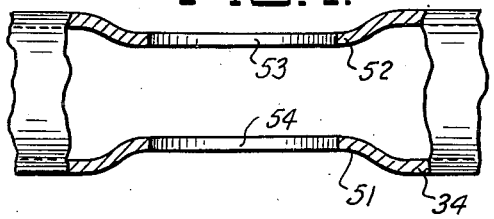
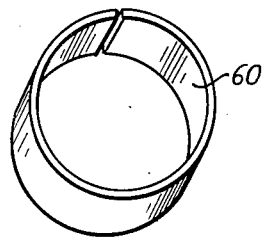
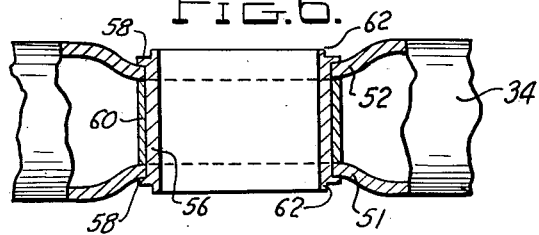
INVENTOR.
AXEL W. KOGSTROM
BY Barnes, Kisselle, Laughlin
    + Raisch
ATTORNEYS Patented Nov. 22, 1949

2,488,979

UNITED STATES PATENT OFFICE 2,488,979

STEERING MECHANISM

Axel W. Kogstrom, Detroit, Mich., assignor to O. & S. Bearing Company, Detroit, Mich., a corporation of Michigan Application April 8, 1948, Serial No. 19,850

5 Claims. (Cl. 280—95)

This invention relates to a steering mechanism and has particularly to do with a steering knuckle and steering gear connecting rod used in present day automotive construction.

The practice today is to use a relay rod which transmits steering force from a pitman arm to the steering knuckle of the front wheels of a vehicle. This relay rod is presently cold rolled and formed with widened sections to receive the ball studs connecting the tie rods.

It is an object of the present invention to provide a relay rod which is much cheaper in construction and equally effective in operation.

It is a further object of the invention to provide a sheet metal relay rod which in construction is particularly adapted to the use of self-lubricating fabric lines bearings.

Other objects and features of the invention relating to details of construction and operation will be apparent in the following description and claims:

Drawings accompany the specification and the various views thereof may be briefly described as:

Figure 1, a bottom view of the front end of a vehicle chassis showing the steering mechanism.

Figure 2, a detailed view showing the manner in which a tie rod is anchored to the relay rod.

Figure 3, a sectional view on line 3—3 of Figure 2.

Figure 4, a sectional view of the relay rod showing a recess for the bearing housing.

Figure 5, a split positioning ring.

Figure 6, a view of a bearing cylinder recess in assembled position.

In Figure 1 a vehicle frame 20 has fastened thereto a standard front wheel mounting construction 22 and 24 of the individual suspension type on which are mounted front wheels 25 and 26. Steering knuckles 27 and 28 are attached to the front wheel king pins in the standard manner. Actuating pitman arm 30 is paralleled by a spaced idler arm 32, both arms being connected by a relay bar 34. The bar 34 is connected by a tie rod 36 to the steering knuckle 27, and by a tie rod 38 to the steering knuckle 28.

The relay bar 34 is connected to the pitman arm 30 at a joint 41 and to the idler arm 32 at a joint 42. Tie rods 36 and 38 are connected to the relay rod 34 at joints 43 and 44. The relay rod 34, constructed in accordance with the present invention, is made from a hollow steel tube. At points adjacent the joints 41, 42, 43 and 44, the tube is flattened to provide parallel walls 51 and 52, which are punched at the widened portion thus formed to provide aligned holes 53 and 54 transverse of the tube. The next step in the bearing construction is the insertion of a bearing housing or tube 56 into the walls 53 and 54. The outer edges of the ends of the housing 56 are struck down at 58 to provide a locking flange over-lapping the margins of the holes 53 and 54 at each end of the tubular bearing housing 56.

Prior to the insertion of the bearing housing 56, into position as shown in Figure 6, a split ring 60 is expanded into the position shown in Figure 6 on a suitable arbor so that it lies between the walls 51 and 52 of the tube 34. The housing 56 holds the ring in expanded position and when the ends of the housing 56 are struck over to form the flanges 58 the entire assembly is locked securely together. The expanded ring 60 serves as a reinforcing stop in this assembling step. When these ends 58 of housing 56 are struck over to form the flanges 58 there is left standing at each end an annular projection 62.

The remainder of the joints may now be installed as shown in Figure 2. A self-lubricating material 66, consisting of a lubricant impregnated fabric liner such as disclosed in the patent to Leonard A. Delp, No. 2,379,478 issued July 3, 1945, is confined by sealing rings 67 and 68 and protected by a dust seal 69 at one end and 70 at the other end to support a ball stud 72 in position. The projection 74 of the ball stud is connected to tie rod 38 to form the joint 44.

After the assembly of the parts is complete the annular flanges 62 projecting from the bearing housing 56 may be peened over to lock the parts securely in position.

Each of the joints in the hollow tube 34 may be formed as described. There is thus formed a strong and relatively light relay bar which is much cheaper than the previously forged bar and which performs all the structural functions required of it.

What I claim is:

1. A relay bar for use in a conventional steering mechanism to connect the pitman arm with the tie rods which comprises a hollow tube, narrowed and pierced at the joint locations, a cylindrical bearing housing projecting through the tube at such locations and a bearing assembly within each said housing, the bearing assembly and the bearing housing being held in position by struck over flanges of the housing forming the bearing housing.

2. A relay bar for a conventional steering mechanism to connect the pitman arm and the tie rods which comprises a hollow tube, narrowed and pierced at the joint positions, a cylindrical bearing housing projecting through said tube at such narrowed portions, a split ring surrounding said housing extending between the narrowed walls of the tube to reinforce the same, and a bearing construction within said housing comprising a ball stud and self-lubricating material interposed between said stud and said housing, all of said parts being held in position by struck over flanges extending outwardly and inwardly from the ends of said cylindrical housing.

3. A relay bar for conventional steering mechanisms to connect the pitman arm and tie rods which comprises a hollow steel tube flattened and widened respectively, on mutually normal axes transverse of the tube, aligned holes in the flattened surfaces, ball studs for the arm and rods, and means in said holes for retaining the ball studs in bearing relation to the tube, said means comprising a cylindrical bearing shell, self-lubricating bearing material lining said shell, and deformable means integral with said shell for retaining said material in position in said shell and said shell in position in said tube.

4. A relay bar for a conventional steering mechanism to connect the pitman arm and the tie rods which comprises a hollow tube, narrowed and pierced at the joint positions, a cylindrical bearing housing projecting through said tube at such narrowed portions, a split ring surrounding said housing extending between the narrowed walls of the tube to reinforce the same, and a bearing construction within said housing comprising a ball stud and self-lubricating material interposed between said stud and said housing, and means on the ends of said cylindrical housing for holding said parts in assembly.

5. A relay bar for a conventional steering mechanism to connect the pitman arm and the tie rods which comprises a hollow tube, narrowed and pierced at the joint positions, a cylindrical bearing housing projecting through said tube at such narrowed portions, a split ring surrounding said housing extending between the narrowed walls of the tube to reinforce the same, and a bearing construction within said housing comprising a ball stud and self-lubricating material interposed between said stud and said housing, and means on one of said parts for holding all of said parts in assembly.

AXEL W. KOGSTROM.

REFERENCES CITED

The following references are of record in the file of this patent:

UNITED STATES PATENTS

| Number | Name | Date |
| --- | --- | --- |
| 900,975 | Balloco | Oct. 13, 1908 |
| 2,215,243 | Klages | Sept. 17, 1940 |